UNITED STATES PATENT OFFICE.

DANIEL M. HOLMES, OF BROOKLYN, NEW YORK.

IMPROVEMENT IN THE MANUFACTURE OF CREAM-CRACKERS.

Specification forming part of Letters Patent No. 58,644, dated October 9, 1866.

*To all whom it may concern:*

Be it known that I, DANIEL M. HOLMES, of Brooklyn, in the county of Kings and State of New York, have invented new and Improved Cream-Crackers; and I do hereby declare that the following is a full, clear, and exact description of the same.

This invention relates to an improved cracker of a very light and piable kind, somewhat similar to those now manufactured by bakers under the name of "egg crackers."

My invention consists in combining certain well-known substances in specific proportions, and treating the dough in such a manner as hereinafter fully set forth, whereby a very superior, light, piable cracker is obtained, one far superior to any now manufactured.

My improved crackers are compounded of the following ingredients: Wheat flour, sixteen pounds; white sugar, two pounds; lard or butter, two pounds; eggs, six dozen; cream tarter, two ounces; soda, one ounce; cream, one quart. These substances are well kneaded, and then rolled or passed between pressure-rollers until all the substances are well incorporated with each other and form a homogeneous mass. The dough is then rolled into a thin sheet, cut into circular pieces of the required size, and then put into boiling water and allowed to remain until they float on the surface. They are then taken out and baked.

The cream is designed to impart a yellowish tinge to the crackers, and may be dispensed with in those cases where the color of the flour will be such as to give that color to the crackers. All the other ingredients are essential, and must be used in every case.

Having thus described my invention, I claim and desire to secure by Letters Patent—

A cracker composed of the ingredients in the properties named, and treated in the manner substantially as set forth.

The above specification of my invention signed by me this 29th day of August, 1866.

DANIEL M. HOLMES.

Witnesses:
ALEX. F. ROBERTS,
J. W. B. CORINGTON.